United States Patent [19]

Vidaurri, Jr.

[11] 4,056,515

[45] Nov. 1, 1977

[54] CONTINUOUS REACTION FOR PREPARATION OF ARYLENE SULFIDE POLYMER

[75] Inventor: Fernando C. Vidaurri, Jr., Bartlesville, Okla.

[73] Assignee: Phillips Petroleum Company, Bartlesville, Okla.

[21] Appl. No.: 671,774

[22] Filed: Mar. 30, 1976

[51] Int. Cl.$^2$ .................. C08G 75/14; C08G 75/16
[52] U.S. Cl. ............................ 260/79.1; 260/79
[58] Field of Search .................. 260/79, 79.1

[56] References Cited

U.S. PATENT DOCUMENTS

| | | | |
|---|---|---|---|
| 3,255,161 | 6/1966 | Cobb | 260/83.7 |
| 3,600,137 | 8/1971 | Girantet et al. | 23/263 |
| 3,607,843 | 9/1971 | Vidaurri | 260/79.1 |
| 3,783,138 | 1/1974 | Miles et al. | 260/79 |
| 3,790,536 | 2/1974 | Vidaurri | 260/79.1 |
| 3,800,845 | 4/1974 | Scoggin | 260/79.1 |
| 3,887,529 | 6/1975 | Rohlfing | 260/79.1 |
| 3,919,177 | 11/1975 | Campbell | 260/79.1 |
| 3,956,060 | 5/1976 | Scoggin | 260/79 |

*Primary Examiner*—Ronald W. Griffin

[57] ABSTRACT

Continuous production of arylene sulfide polymer is provided in a series of two or more substantially liquid-full reactors maintained at seriatim reduced temperature and pressure and discharging into a final zone which has a vapor space above a controlled liquid level and is maintained at a pressure lower than the liquid-full reaction train by vapor withdrawal with the reaction temperature increased at least to exceed all but the highest temperature in the liquid-full reactors so that at least a portion of the water produced in the arylene sulfide polymerization and a portion of the organic amide diluent are vaporized to concentrate the reaction slurry. The reaction slurry effluent from the vaporizing reactor can then be flashed with or without the aid of superheated steam dilution to produce a vapor which can be condensed, separated and recycled to the continuous reaction process and a particulate, polymeric product.

4 Claims, 1 Drawing Figure

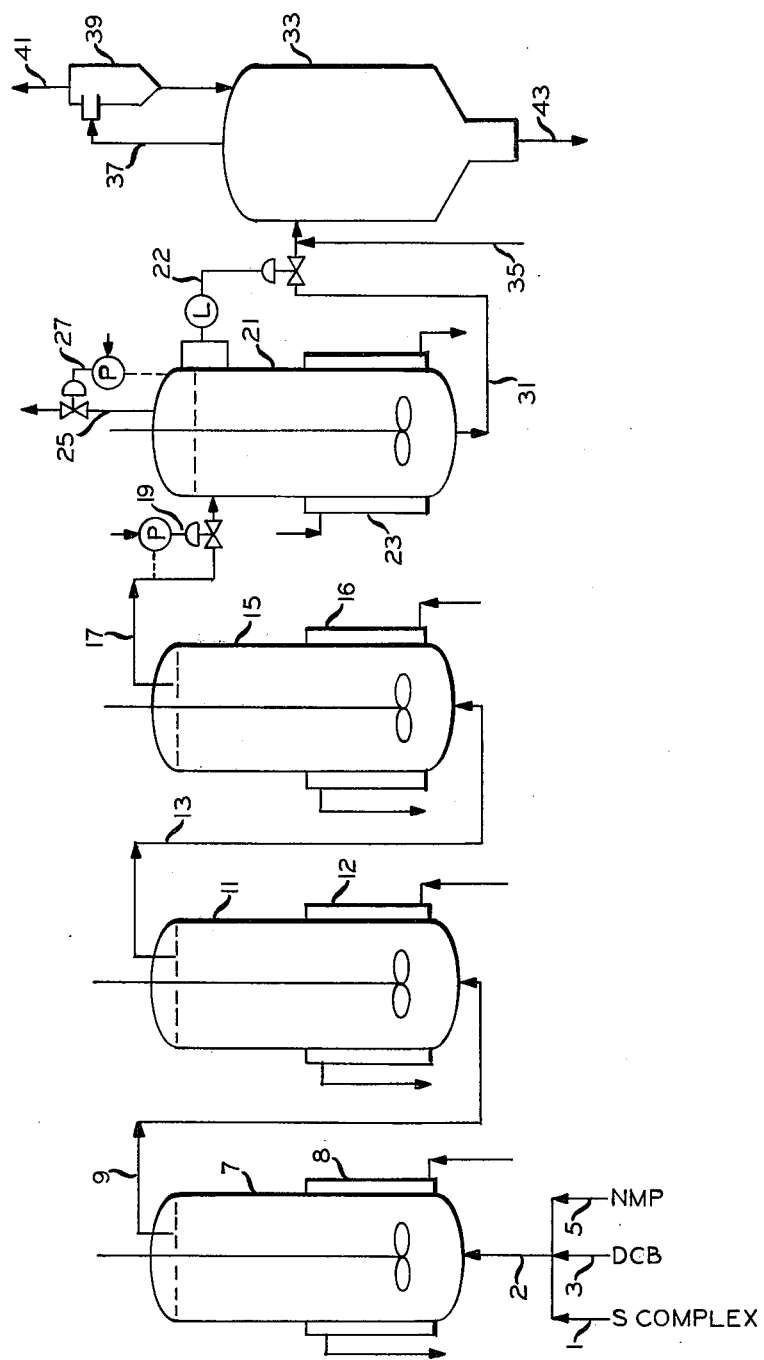

CONTINUOUS REACTION FOR PREPARATION OF ARYLENE SULFIDE POLYMER

BACKGROUND OF THE INVENTION

This invention is related to the production of arlyene sulfide polymer. More particularly this invention is related to the production of phenylene sulfide polymer. In one of its aspects this invention is related to the continuous production of arylene sulfide polymer. In another of its aspects this invention is related to the use of multiple reaction zones in series in the continuous production of arylene sulfide polymer.

In one concept of this invention, it relates to the continuous production of arylene sulfide polymer using a series of substantially liquid-full reaction zones with seriatim reduction of temperature and pressure followed by a final liquid-containing zone in which the pressure is further reduced and in which the temperature is raised sufficiently to provide ample heat to the reaction slurry for flash evaporation of the more volatile components in the effluent slurry in this zone and downstream from this final zone.

Processes for producing arylene sulfide polymers are well known as shown in U.S. Pat. Nos. 3,354,129, 3,790,536 and the copending application Ser. No. 495,450 filed Aug. 8, 1974 now U.S. Pat. No. 3,919,177. In these, methods are disclosed for producing arylene sulfide polymer both with and without the use of modifying components in the reaction mixture. Processes for production of arylene sulfide polymer, or more specifically, phenylene sulfide polymer, have heretofore generally been limited to batch operation. Up to now a satisfactory method for continuous operation of a process for producing arylene sulfide polymers had not been developed. An operable and economic method for the continuous production of arylene sulfide polymer would be advantageous.

It is an object of this invention to provide a method for the continuous production of arylene sulfide polymer. It is another object of this invention to provide a multiple reaction zone process for the production of arlene sulfide polymer. It is still another object of this invention to provide a multiple reaction zone process for the production of arylene sulfide polymer in which the pressure of the reaction zones is regulated to provide flow from one reaction zone to the next without the use of mechanical means of transfer between the reaction zones.

Other aspects, concepts, objects and the various advantages of this invention will be apparent from a study of this disclosure, the drawing, and the appended claims.

STATEMENT OF THE INVENTION

According to the present invention there is provided a continuous process for producing arylene sulfide polymer using a plurality of reaction zones connected in series. In this process a series of two more substantially liquid-full reaction zones is operated at temperature and pressure conditions which provide a seriatim decrease from the first reactor to the last reactor in the series in both the temperatures and the pressures imposed therein. The effluent from the last liquid-full reactor is transferred to a final vessel having a vapor space above a controlled liquid level operated at a pressure lower than the pressure in the preceding reaction vessel and at a temperature that is elevated sufficiently to evaporate portions of both the organic amide diluent and of the water produced in the polymerization reaction. A sufficient amount of water and diluent is evaporated to concentrate the polymer slurry in this last vessel and the temperature of the slurry is raised sufficiently so that effluent therefrom can be flashed at a lower pressure to produce vapor from which condensible liquids can be recovered leaving a particulate polymeric product.

In a preferred embodiment of the invention the substantially liquid-full reaction zones comprise a series of three agitated reactors followed by a single agitated vessel operated with a vapor space above a controlled liquid level.

In another embodiment of the invention the effluent from each of the substantially liquid-full reactors is removed from a location at or near the top of the reactor vessel with entering reactant material fed at or near the bottom of the reaction vessel. Such a configuration allows the use of the reactant and diluent charge pumps to provide the relatively low pressure drop (driving force) needed through the train, thus avoiding the severe problems incurred in the pumping of reaction slurry. Further, little or no vaporization of diluent and water takes place in these reactors as the step-wise temperature decreases from the first, to the second, to the third reactor are chosen based on the vapor pressure produced by the anticipated reaction slurry compositions therein. Small amounts of vapor generated will pass rapidly through the train without disturbance to the operation by virtue of the effluent eduction piping.

Although the conditions of temperature and pressure for the reaction according to this invention can be varied within those temperature and pressure ranges at which polymerization of the reactants will take place, as given in U.S. Pat. No. 3,790,356, it is preferred that the first liquid-full reactor in the series be operated at a relatively high temperature in the range of about 260° to about 310° C and a pressure of about 13 kg/cm² to about 17 kg/cm² (absolute).

As polymerization takes place, water is liberated from the organic amide-water-sodium sulfide complex reactant so that the vapor pressure of the reaction mixture increases in the reaction vessel. The first reaction vessel should, therefore, be of sufficient size and possess sufficient cooling capacity to allow a major part of the polymerization to take place within that vessel at a desired reaction temperature before transfer of effluent to the second substantially liquid-full reaction vessel.

The subsequent liquid-full reaction vessels within the reaction train are supplied with feed from the previous vessel by the driving force of pressure generated by feed pumping and sustained by vapor pressure. In general, the temperatures and pressures of each succeeding liquid-full reaction zone will be, respectively, in the range of about 5° to about 25° C less than the preceding vessel and about 0.5 to about 2 Kg/cm² less than the preceding vessel.

In a preferred embodiment of the invention the fourth vessel serves as a heat source and a phase separator. Here the slurry which is the effluent from the third liquid-full reaction vessel is reheated to a temperature higher than that maintained in the second liquid-full reaction vessel. The pressure in the fourth vessel is maintained below that of the third reactor by a substantially continuous withdrawal of water and organic amide diluent vapor, primarily vaporized water, which reduces the pressure in that vessel. The removal of liquid also produces some concentration of the polymer slurry in the vessel.

Effluent from the fourth vessel is flashed at a substantially reduced pressure, generally in the range of atmospheric pressure, to produce a vapor stream and a solid particulate polymeric product. The flashing is a process well known in the art and can be accomplished by reduction of a pressure on a heated liquid or with the addition of superheated steam to the slurry as the pressure is reduced. Steam-assisted flashing of arylene sulfide polymer slurry is well known in the art.

The method of this invention for continuously producing arylene sulfide polymer using a plurality of reaction vessels connected in series is suitable for use with any reaction process producing arylene sulfide polymer in which a compound suitable as a sulfur source is contacted with a dihalo aromatic compound in the presence of an organic amide and, optionally, in the presence of a polymerization modifying compound such as an alkali metal carboxylate.

The processes for producing arylene sulfide polymer preferred for use with a continuous polymerization process of this invention are those polymerization systems such as set out in U.S. Pat. Nos. 3,354,129, 3,790,536 and copending application Ser. No. 495,450 filed Aug. 8, 1974. The continuous polymerization process of this invention is particularly useful with those methods for producing arylene sulfide polymer in which an organic amide is contacted with a sulfur source to form a complex in a solution of the organic amide, with this complex then being reacted with a dihalo aromatic compound in the presence of a sufficient amount of the same organic amide to provide a diluent for the polymerization process.

The invention can be best understood in conjunction with the drawing which is a schematic representation of a continuous reaction system comprising three separate substantially liquid-full reaction vessels, a fourth vessel having a vapor space above a controlled liquid level, and a vessel for the flash vaporization of liquids from the reaction slurry to produce a particulate, polymeric product. The drawing will be described in conjunction with a particular embodiment of the invention in which specific reactants are used. This example should be taken as illustrative and not as restrictive to the scope of the invention.

Referring now to the drawing, a water-containing chemical complex of sodium sulfide ($Na_2S$) (which serves as a sulfur source) and N-methyl-2-pyrrolidone (NMP) is prepared by heating a mixture comprising N-methyl-2-pyrrolidone and sodium sulfide in a weight ratio of about 2.2 to 1 at about 200° C. This complex is fed continuously at a controlled flow rate through line 1. Similarly, 1,4-dichlorobenzene (DCB) is fed through line 3 and an additional flow rate of N-methyl-2-pyrrolidone (NMP), used as a polar diluent, is metered through line 5 into line 2 as reactant charge to first reactor vessel 7.

The dichlorobenzene is supplied on the basis of one mole per mole of sodium sulfide; the NMP diluent is supplied on the basis of approximately a 2 to 1 weight ratio to dichlorobenzene. The reaction conditions in agitated reactor 7 are maintained at a temperature level of approximately 288° C and a pressure of approximately 15 $Kg/cm^2$ absolute with cooling by hot oil in jacket 8. At these conditions phenylene sulfide polymer is formed and water is produced in the polymerization reaction thereby generating vapor pressure in the reaction vessel 7 which provides the driving force for transferring polymerization product and reaction mixture to the subsequent reactor vessels 11 and 15. The reactor vessels are sized in relation to desired flow rates of reactants and polymer production rates whereby the reactants are maintained in the vessels for a time sufficient to generate the desired reaction product and thereby a sufficient increase in pressure in the vessels to provide the necessary driving force.

For example, if reactors 7, 11 and 15 are pressure vessels of 6.5 feet (2.0 meters) in diameter by 10.5 feet (3.2 meters) high with an operating liquid-slurry capacity of about 2000 gallons (7570 liters), weight feed rates (per hour) of N-methyl-2-pyrrolidone of 8000 pounds (3622 kilograms), plus an aqueous sodium sulfide solution (which becomes a sulfur complex source with NMP) of 3707 pounds (1624 kilograms) containing about 2088 pounds (949 kilograms) of $Na_2S$ plus 1,4-dichlorobenzene of 3933 pounds (1781 kilograms) will produce average residence times of about 1.075 hours in each vessel. The inlet of the reactants into reaction vessel 7 is near the bottom of the vessel with exit of material through eduction line 9 located in the top of the reactor vessel 7. This vessel is sized so as to allow retention of reaction mixture in the agitated vessel for a sufficient time to insure the desired degree of conversion to polymer.

Reaction effluent from reactor vessel 7 is transferred by line 9 into reactor vessel 11, which is also an agitated vessel and which also is maintained substantially liquid-full, by virtue of a pressure drop between first reactor vessel 7 and second reactor vessel 11, the latter operating at about 13.5 $Kg/cm^2$ absolute and 274° C with cooling by hot oil in jacket 12. Second reactor vessel has the same characteristics of inlet and outlet as the first reactor vessel 7. Similarly, reaction effluent from the second reactor vessel 11 is transferred through line 13 to a third substantially liquid-full, agitated reactor vessel 15. Transfer of effluent is induced by the lower pressure in vessel 15 as compared to vessel 11. The inlet and outlet characteristics of vessel 15 are the same as those for vessel 11. The reactor pressure in vessel 15 is about 12 $Kg/cm^2$ absolute with cooling to about 260° C by hot oil in jacket 16. The reaction temperature in vessel 15 is approximately 260° C as compared to 274° C for vessel 11 and 288° C for vessel 7, thus producing a successive decline in vapor pressure of the nearly-full reaction vessels in which the concentrations of vapor pressure generating components are nearly the same.

Effluent from vessel 15 flows through transfer line 17 controlled by back pressure regulator and valve system 19 at about 12 $Kg/cm^2$ absolute into vessel 21. Vessel 21 is also an agitated vessel, however, it is operated with a substantial vapor space over a controlled liquid level suitably maintained by level control system 22. Vessel 21 contains jacket means 23 which may be supplemented by a heat exchanger on line 17 (not shown) for supplying heat to the reaction slurry so that a portion of the liquid may be evaporated from the slurry within vessel 21 thereby sufficiently reducing the pressure to induce flow from the series of substantially liquid-full reactors. Vapor is removed overhead through line 25 controlled by back pressure regulator and valve system 27 at about 10 $Kg/cm^2$ absolute for recovery, condensation, separation, and recycling of the NMP solvent and unreacted DCB contained in this predominantly water vapor stream.

In vessel 21 the temperature of the reaction slurry is raised in excess of the temperature of the second reactor, i.e.: above 274° C. This temperature rise provides sufficient heat in the slurry to permit flashing of the effluent from vessel 21 through line 31 into flash evaporation vessel 33. As described herein, superheated steam is admitted through line 35 to be mixed with the reaction slurry in line 31 as an aid to the evaporation of liquid diluent and other volatiles in tank 33. Vapor flashed from the reaction slurry in tank 33 is transferred through line 37, to cyclone separator 39 wherein entertained particulate polymer and inorganic matter are removed, and thence through vapor line 41 for recovery of NMP solvent and unreacted DCB as desired. Particulate polymeric product is recovered through line 43 from the base of flash tank 33.

The polymerization reaction proceeds in the four liquid-slurry-containing vessels 7, 11, 15 and 21 to substantially 100 percent conversion of the dichlorobenzene fed to reactor 7 in increments of about 60 percent conversion in vessel 7, 30 percent in 11, 8 percent in 15 and 2 percent in 21. Based on the previously given feed rates, about 2886 pounds (1309 Kg) of poly(phenylene sulfide) and 3124 pounds (1417 Kg) of sodium chloride are produced per hour, which are recovered through line 43 for further processing to separate the salts from the useful polymeric resin. The bulk of the contained water liberated progressively from the sulfur complex source (1285 pounds – 583Kg) is removed by line 25 to reduce the system pressure to about 10 Kg/cm² absolute at a desired temperature of about 288° C, with only a minor amount of diluent NMP being included in this vapor stream. The bulk of the NMP (8000 pounds – 3622 Kg in total) and the balance of the water are removed by the lower pressure (about 1 Kg/cm² absolute) flashing operation in vessel 33 and this vapor is removed therefrom by line 41 along with the superheated steam added by line 35 to assist the flash vaporization.

I claim:

1. A continuous process using a plurality of agitated reaction vessels connected in series for producing arylene sulfide polymer by contacting, in an organic amide, a dihalo aromatic compound with a suitable sulfur source to produce a particulate, polymeric product, said method comprising:

a. introducing the reactants into a first reaction zone maintained at substantially liquid-full conditions at a temperature in the range of about 260° C to about 310° C suitable to initiate a polymerization reaction thereby providing a polymerization reaction pressure sufficient to drive the reaction mass through a series of reaction zones;

b. passing reactants and polymerization product from said first reaction zone into a second, substantially liquid-full reaction zone maintained at a polymerization temperature said temperature in the range of about 5° C to about 25° C lower than the temperature of said first zone and a pressure in the range of about 0.5 Kg/cm² to about 2 Kg/cm² lower than the pressure in said first zone;

c. passing partially polymerized reactants and polymerization product from said second reaction zone into a third reaction zone maintained at a polymerization temperature in the range of about 5° C to about 25° C lower than said second reaction zone and a pressure in the range of about 0.5 Kg/cm² to about 2 Kg/cm² lower than the pressure in said second zone;

d. passing the effluent from said third reaction zone into a fourth zone having a vapor space above a controlled liquid level wherein the pressure is in the range of about 0.5 Kg/cm² to about 2 Kg/cm² lower than in the third zone and wherein the temperature is increased to exceed the temperature of said second reaction zone sufficiently to evaporate a portion of the water and organic amide content of the effluent; and e. subjecting the reaction mixture from the fourth reaction zone to reduced pressure thereby flash evaporating the liquid portion to recover a polymeric, particulate product and a vapor.

2. The method of claim 1 wherein the pressure range in said first reaction vessel is about 13 Kg/cm² to about 17 Kg/cm².

3. The method of claim 1 wherein the reaction mixture also comprises an alkali metal carboxylate, polymerization modifying compound.

4. The process of claim 1 wherein the flash evaporation is accomplished with the aid of a steam diluent.

* * * * *